(12) United States Patent
White et al.

(10) Patent No.: US 6,968,314 B1
(45) Date of Patent: Nov. 22, 2005

(54) ENHANCED SECURITY FEATURES FOR AN AUTOMATED ORDER FULFILLMENT SYSTEM

(75) Inventors: Michael T. White, Hopewell Junction, NY (US); Cathy A. Martin, Wappingers Falls, NY (US); Mary Ann Moore, Poughquag, NY (US); David Z. Neill, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 09/469,633

(22) Filed: Dec. 22, 1999

(51) Int. Cl.$^7$ .............................................. G06F 17/60
(52) U.S. Cl. ............................................. 705/9; 705/8
(58) Field of Search ................................... 705/8, 7, 9

(56) References Cited

U.S. PATENT DOCUMENTS

| | | | |
|---|---|---|---|
| 4,937,743 A | | 6/1990 | Rassman et al. |
| 5,636,124 A | | 6/1997 | Rischar et al. |
| 5,668,944 A | * | 9/1997 | Berry ........................... 714/47 |
| 5,745,736 A | * | 4/1998 | Picart ......................... 709/103 |
| 5,765,140 A | * | 6/1998 | Knudson et al. ............... 705/9 |
| 5,774,866 A | * | 6/1998 | Horwitz et al. ................ 705/7 |
| 6,101,481 A | * | 8/2000 | Miller ........................... 705/9 |
| 6,157,915 A | * | 12/2000 | Bhaskaran et al. ............ 705/7 |
| 6,275,812 B1 | * | 8/2001 | Haq et al. ..................... 705/11 |
| 2001/0014866 A1 | * | 8/2001 | Conmy et al. .................. 705/9 |

OTHER PUBLICATIONS

"PeopleSoft Charts E-Business Strategy," PC Week Nov. 9, 1998 (vol. 15, No. 45), p. 18.
"The Power of Enterprise Computing," Internal Auditor Feb. 1997 (vol. 54, No. 1), p. 34.
"SAP R/3 Tuning and Upgrade Practices," CMG97 Proceedings, Orlando, FL (Dec. 1997), p. 516.

* cited by examiner

Primary Examiner—F. Zeender
(74) Attorney, Agent, or Firm—Jay H. Anderson

(57) ABSTRACT

A method is described for facilitating implementation of an automated system for transacting business, where the system users are subject to predetermined rules governing business conduct. Each user is assigned a user ID and has a security profile, which lists the transactions that user is authorized to perform. A list is prepared of pairs of incompatible transactions (transactions which, if performed by the same user, would violate the predetermined rules). Each security profile is compared with the list, to identify security profiles including at least one pair of incompatible transactions. A report is then generated indicating those security profiles which include incompatible transactions and the user identifiers associated with those security profiles.

4 Claims, 5 Drawing Sheets

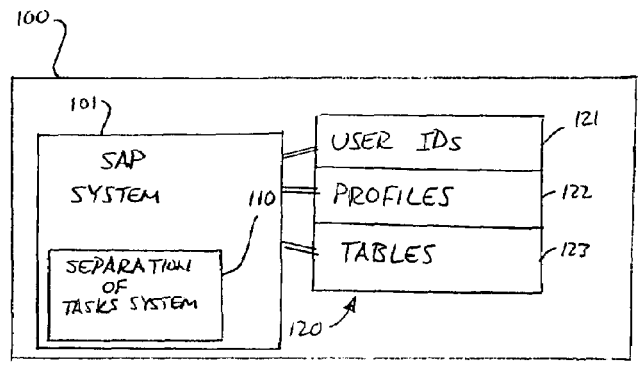

123-1

| TRANSACTION ID | TRANSACTION NAME |
|---|---|
| MM01 | INITIATE ITEM BUILD |
| MM02 | SHIP TO CUSTOMER |
| MM03 | RETURN ITEM TO STOCK |
| VA01 | SEND CUSTOMER INVOICE |
| VA02 | CREATE ORDER |
| VA04 | CREDIT CUSTOMER ACCT. |
| ⋮ | ⋮ |

FIG. 3A 123-2

| TRANSACTION ID | TRANSACTION ID |
|---|---|
| MM01 | VA02 |
| MM01 | VA04 |
| MM01 | MM02 |
| MM01 | MM03 |
| VA02 | MM01 |
| VA02 | MM02 |
| ⋮ | ⋮ |

FIG. 3B

ENHANCED SECURITY FEATURES FOR AN AUTOMATED ORDER FULFILLMENT SYSTEM

FIELD OF THE INVENTION

This invention relates to improvements in an automated system for managing fulfillment of customer orders, and more particularly to security enhancements to prevent fraud by system users.

BACKGROUND OF THE INVENTION

A number of processes related to the fulfillment of customer orders lend themselves to automation. For example, systems have been developed for (1) scheduling the shipment of goods to a customer and (2) managing customer accounts payable. More recently, an integrated system for managing the fulfillment of orders has become available. An example of such an integrated system is the SAP™ system ("Systems, Applications, Products and Data Processing") offered by SAP AG, Walldorf, Germany.

Security functions in separate materials management and customer accounts-payable systems, providing safeguards against fraud and inappropriate business practices, can be inadequate when those systems are integrated (for example, into the SAP system). Each user (known to the system by his user ID) has a "security profile" listing the transactions he may approve or the tasks he is authorized to perform. Some of these transactions are incompatible, in the sense that having them under control of a single individual could result in abuse of the system. For example, a user authorized both (1) to approve the shipment of goods to a certain customer and (2) to adjust the amount owed by a customer, could fraudulently ship goods to himself free of charge. Furthermore, an individual with a single user ID but multiple security profiles could initiate a transaction under one profile, then instruct the system to perform an incompatible transaction appearing under another profile.

Accordingly, there is a need for improved security in an automated system for managing the fulfillment of orders, whereby the security profiles of users are analyzed and modified to prevent incompatible transactions by those users.

SUMMARY OF THE INVENTION

The present invention provides a system for the separation of incompatible transactions within a system such as the SAP system, so that critical tasks (those tasks susceptible to abuse or fraud) may be assigned to different individuals. In accordance with the invention, this system determines which transactions in a user's security profile are incompatible with each other, and then generates a report indicating the security profile which has incompatible transactions. The security profiles may then be modified, to prevent inappropriate business conduct including fraud and misuse of funds.

According to a first aspect of the present invention, a method is provided which includes the steps of assigning a user identifier to each user of the system; preparing a security profile corresponding to each identifier, where each security profile includes a set of authorized transactions; and preparing a list of pairs of incompatible transactions in accordance with predetermined rules of business conduct. Then, according to this method, each security profile is compared with that list, to identify security profiles including at least one pair of incompatible transactions. A report is generated indicating those security profiles which include incompatible transactions and the user identifiers associated with those security profiles. If a security profile is found to have a pair of incompatible transactions, it may be modified; alternatively, the list of pairs of incompatible transactions may be modified, so that the security profile does not include a pair of incompatible transactions. Another report may then be generated indicating the modification made.

A given user identifier may have more than one security profile associated therewith. In accordance with a second aspect of the invention, a method is provided which includes the steps of assigning a user identifier to each user of the system; preparing a plurality of security profiles, where each user identifier is associated with at least one security profile; and preparing a list of pairs of incompatible transactions in accordance with predetermined business conduct rules. Furthermore, the method includes the steps of generating a set of transactions in all of the security profiles associated with each user identifier, and comparing that set of transactions with the list of pairs of incompatible transactions. This method therefore permits identification of user identifiers having associated therewith at least one pair of incompatible transactions, even if those transactions are in different security profiles. A report is then generated indicating those user identifiers. A security profile associated with such a user identifier may be modified; alternatively, the list of pairs of incompatible transactions may be modified, so that the user identifier no longer has a pair of incompatible transactions associated therewith. Another report may then be generated indicating any modification which has been made.

BRIEF DESCRIPTION OF THE DRAWINGS

FIG. 1 is a schematic block diagram of a computer system on which software embodying the present invention is loaded, and which includes a storage device for storing user IDs, security profiles, and transaction tables used in accordance with the present invention.

FIG. 2A illustrates in tabular form the structure of the user ID database.

FIG. 2B illustrates in tabular form the structure of the security profile database.

FIG. 3A illustrates the structure of a table of critical transactions.

FIG. 3B illustrates the structure of a table of incompatible critical transactions.

DETAILED DESCRIPTION OF THE PREFERRED EMBODIMENTS

Figure 4:
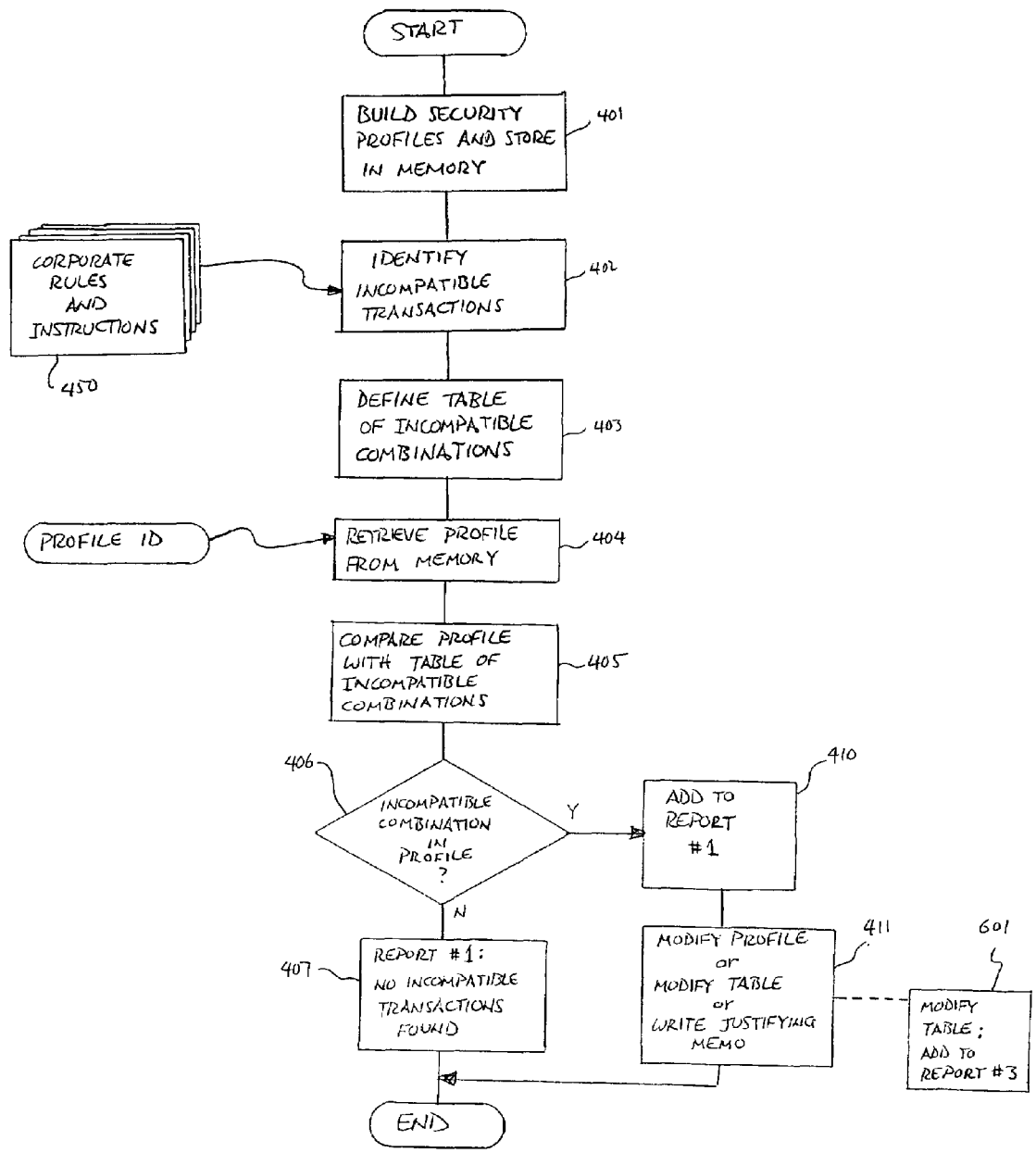
FIG. 4 is a flowchart showing a method for analyzing security profiles and generating a report of incompatible transactions in a profile, according to a first embodiment of the present invention.

FIG. 1 is a block diagram of a computer system 100 on which is loaded a system 101 for managing fulfillment of orders (e.g. the SAP system) which includes a system 110 for separating critical tasks or transactions among various system users, according to the present invention. The computer system 100 also includes a storage device 120, in which is stored a table 121 of user IDs for the system 101; security profiles 122 comprising lists of specific critical transactions; and tables 123 of critical transactions and combinations of incompatible transactions. The systems 101 and 110 access these tables, as shown schematically in FIG. 1.

The storage device 120 may be an integral part of the computer system 100, as shown in FIG. 1, or may be external to it. The executable code for the system 110 and the databases 121–123 may be stored on a variety of possible computer-readable media (RAM, ROM, CD-ROM, etc.).

The system 110 of the present invention is shown in FIG. 1 as integrated into the commercially available system 101 for managing fulfillment of orders. Alternatively, the system 110 may be separate from system 101, or be invoked as a subroutine from system 101 (in which case the analysis of critical transactions may itself be viewed as a critical transaction, to be performed only by certain selected users). The user IDs 121, profiles 122 and tables 123 contain information used in the analysis, as detailed below.

As shown in FIG. 2A, each user of the system 101 is assigned one record in the user ID database 121. Each record has fields 201 and 202 for the user ID and user name respectively, and a field 203 identifying the security profile or profiles assigned to that user. A given user may have a unique or custom-designed profile (for example, profile #1 in FIG. 2A), have a single standard profile (such as profiles #2 and #3), or may be assigned multiple profiles. The database of security profiles is shown in FIG. 2B. Each profile identifier is associated with a group of critical transactions; the identifiers for the transactions in a given profile are listed in field 204. In this illustration, the transactions are identified by a four-character code. A system user with a given user ID is authorized to perform any of the transactions in the profile or profiles assigned to his user ID.

The profiles are constructed and analyzed using tables 123-1 and 123-2 of critical transactions and incompatible combinations thereof, as shown in FIGS. 3A and 3B. FIG. 3A shows the structure of table 123-1, which has a list of all the critical transactions performed in system 101. Only the critical transactions—that is, those susceptible to abuse or fraud—need be listed in table 123-1. Each record of table 123-1 has the identifier 205 of the transaction, and the name of the transaction 206. Table 123-2, which is developed manually using the organization's rules and instructions (e.g. corporate "Business Conduct Guidelines"), lists combinations of critical transactions deemed incompatible: transactions which, if performed by the same user, would permit misuse of the system or fraud. Each record 301 of this table has the identifiers of two transactions which should not appear in the same security profile, or in a set of security profiles belonging to a particular system user.

In the following embodiments of the invention, the processes of identifying and tabulating incompatible transactions are not fully automated. It will be appreciated that these processes depend upon an understanding of both the order-fulfillment management system and the business-conduct ethics governing the organization using the system. These particular processes require a level of professional judgment in accordance with generally accepted accounting practices ("GAAP"), which then are implemented by a human system administrator.

A flowchart of a method of analyzing a security profile, according to a first embodiment of the invention, is shown in FIG. 4. In step 401, the table 122 of security profiles is built and stored in memory. In step 402, the combinations of critical transactions which are incompatible are identified. In a corporate environment, the corporate rules and instructions 450 serve as input for this step. The table 123-2, which lists all the combinations of incompatible transactions, is then built (step 403).

The identifier 203 of the profile to be analyzed is input by the system administrator, and this profile is retrieved from memory (step 404), and the transactions associated with that profile are compared with the table 123-2 (step 405). The results of this comparison (step 406) are included in a report (here referred to as Report #1). If no conflicting transactions exist in the profile, the report states that result (step 407). If one or more pairs of conflicting transactions are found, these are listed in the report (step 410). At this point (step 411), the person performing the analysis may modify the profile or the table 123-2 to remove the conflict between transactions. Alternatively, he may choose to allow the conflicting transactions to remain in the profile, and prepare a memo to management justifying this course of action.

It will be appreciated that these steps may be performed using an incomplete profile, so that the profile may be built without having incompatible transactions. In particular, it is desirable to analyze the profile (and make any necessary adjustments) while the order-fulfillment management system is in development, before it is moved to a production environment.

Figure 5A:
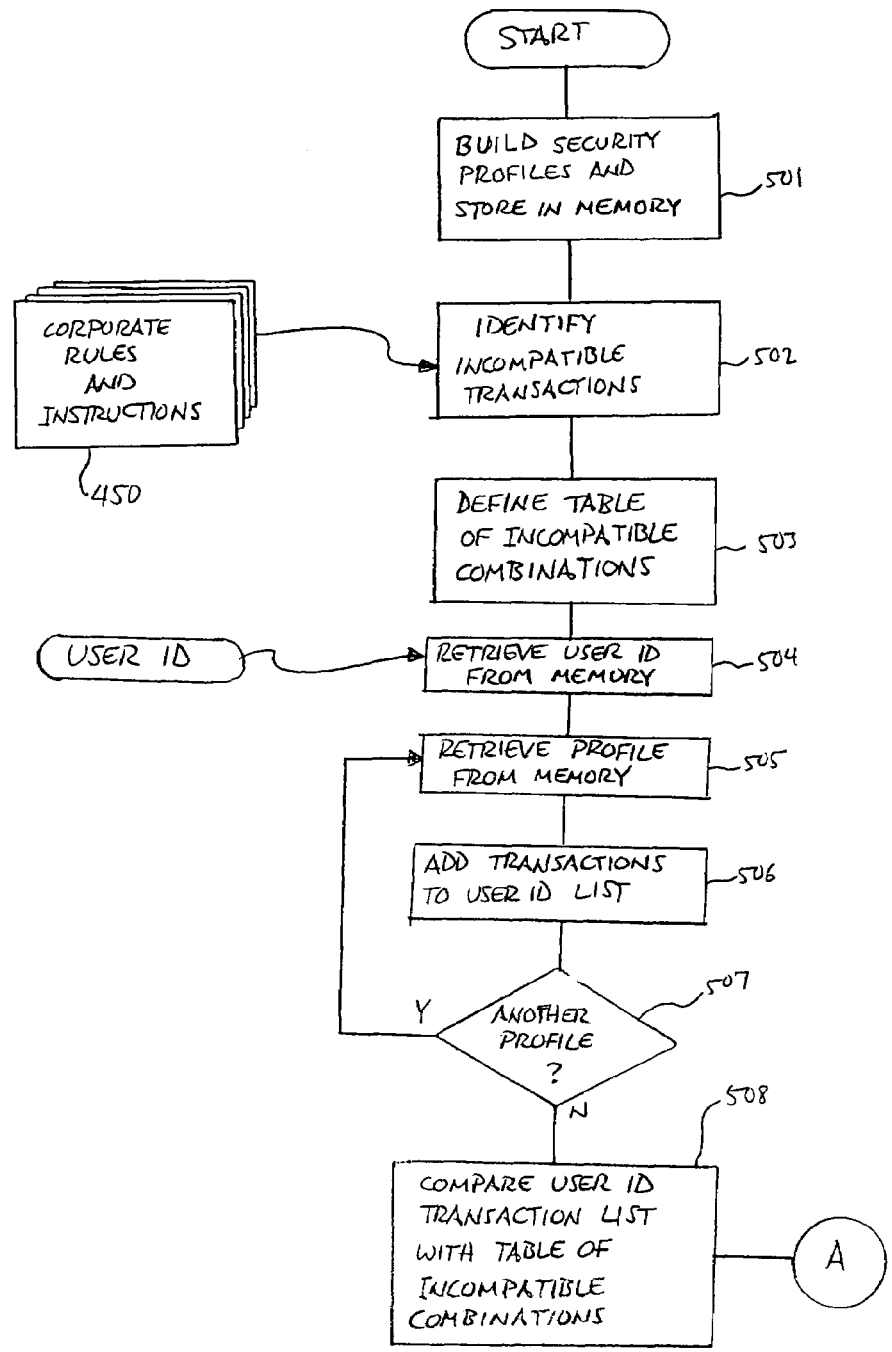
FIGS. 5A and 5B are connected flowcharts showing a method for analyzing security profiles associated with a given user ID and generating a report of incompatible transactions for that user, according to a second embodiment of the present invention.
Figure 5B:
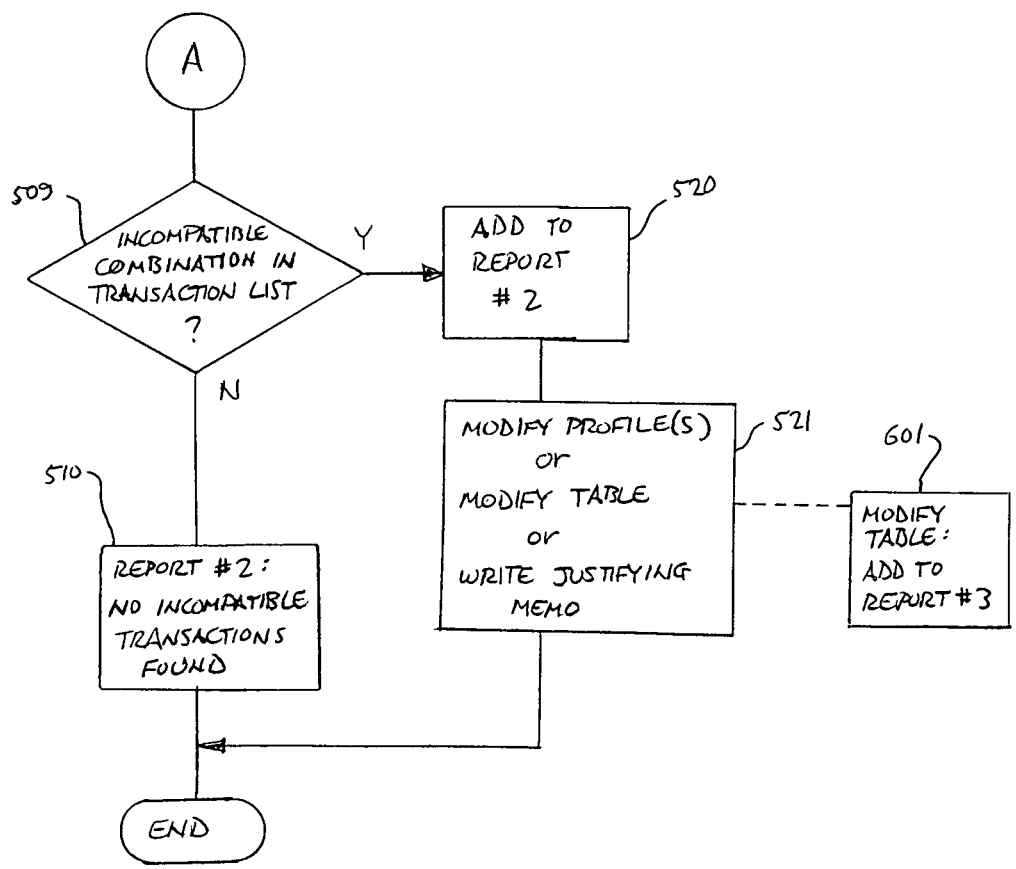

According to a second embodiment of the invention, another report (termed Report #2) is generated in connection with the analysis shown in the flowcharts of FIGS. 5A and 5B. Using a user ID as input, this report lists all of the transactions that are in conflict across all the profiles associated with that user ID. In steps 501–503, the tables 122 and 123-2 are built, as described above with reference to steps 401–403.

In accordance with input from the system administrator, a user ID is retrieved from the user ID database 121 (step 504), and a profile associated with that user ID is retrieved from database 122 (step 505; see FIGS. 2A and 2B). However, a particular user may be authorized to perform tasks or approve transactions from more than one security profile. All of the profiles associated with that user ID are retrieved (steps 505–507), and the transactions of those profiles are collected in a single, temporary list which is compared with the list of incompatible transactions in table 123-2 (step 508). Accordingly, all incompatible transactions belonging to a user ID are identified, whether that user ID has a single security profile or multiple profiles.

If the user ID does not have any profiles with incompatible transactions, Report #2 states that result (step 510). If, however, a set of incompatible transactions is found (step 509), those transactions are listed in Report #2 (step 511), along with the user ID and the profile(s) in which the transactions appear. As in the first embodiment, the person performing the analysis may take a number of actions to resolve the presence of incompatible transactions (step 521): modify the profile, modify the table 123-2, or justify the continuance of conflicting transactions belonging to the user ID.

It is desirable to produce another report (Report #3) which provides an audit trail; that is, a report listing all the activity that has occurred against the transaction table 123-2. Thus if the system administrator intervenes to remove a conflict in a security profile, this action will be documented (step 601 in FIGS. 4 and 5B).

It will be appreciated that this procedure may be used when developing and testing a set of profiles for a system user. In that event, a dummy user ID with those profiles assigned may be used as input. In addition, if it is desired to analyze a single profile with the procedure of FIGS. 5A and 5B, a dummy user ID with that profile may be used as input.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following

We claim:

1. A method for facilitating implementation of an automated system for transacting business, the system having a plurality of users, the users being subject to predetermined rules governing business conduct, the method comprising the steps of;

assigning a user identifier to each user of the system;

preparing a security profile corresponding to each identifier, each security profile including a set of authorized transactions;

preparing a list of pairs of incompatible transactions if performed by the same user in accordance with said predetermined rules;

comparing each security profile with said list, to identity search profiles including at least one pair of incompatible transactions; and generating a report indicating those security profiles which include incompatible transactions and the user identifiers associated with those security profiles, wherein said comparing step and said generating step are automated.

2. A method according to claim 1, further comprising the steps of:

after said preparing steps, storing the security profiles and the list of pairs of incompatible transactions in a computer-readable storage medium; and retrieving the security profiles and the list of pairs of incompatible transactions from the computer-readable storage medium, wherein said storing step and said retrieving step are automated.

3. A method according to claim 1, further comprising the steps of:

modifying at least one of (a) a security profile including a pair of incompatible transactions, and (b) said list of pairs of incompatible transactions, so that said security profile after modification does not include a pair of incompatible transactions; and generating a report indicating the modification made in said modifying step.

4. A computer-readable storage medium having stored therein instructions for performing an automated method for facilitating implementation of an automated system for translating business, the system having a plurality of users each having a user identifier, the users being subject to predetermined rules governing business conduct, the method comprising the steps of:

retrieving a security profile associated with each user identifier, the security profile including a set of authorized transactions;

retrieving a list of pairs of incompatible transactions if performed by the same user, where said list is prepared in accordance with said predetermined rules;

comparing each security profile with said list, to identity security profiles including at least one pair of incompatible transactions; and generating a report indicating those security profiles which include incompatible transactions and the user identifiers associated with those security profiles.

* * * * *